United States Patent
Yoshizawa et al.

(10) Patent No.: US 9,068,579 B2
(45) Date of Patent: Jun. 30, 2015

(54) BRAKE SYSTEM OF STRADDLE TYPE VEHICLE

(71) Applicant: HONDA MOTOR CO., LTD., Tokyo (JP)

(72) Inventors: Tomoya Yoshizawa, Wako (JP); Yohei Makuta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 13/716,175

(22) Filed: Dec. 16, 2012

(65) Prior Publication Data
US 2013/0167526 A1 Jul. 4, 2013

(30) Foreign Application Priority Data
Dec. 28, 2011 (JP) ................... 2011-288817

(51) Int. Cl.
| | |
|---|---|
| *B60T 11/18* | (2006.01) |
| *F15B 21/00* | (2006.01) |
| *B60T 7/06* | (2006.01) |
| *G05G 5/05* | (2006.01) |
| *G05G 1/44* | (2008.04) |

(52) U.S. Cl.
CPC . *F15B 21/00* (2013.01); *B60T 7/06* (2013.01); *B60T 11/18* (2013.01); *G05G 1/44* (2013.01); *G05G 5/05* (2013.01)

(58) Field of Classification Search
USPC ............ 188/344, 345, 347, 358; 60/549, 533; 92/133
See application file for complete search history.

(56) References Cited

U.S. PATENT DOCUMENTS

| | | | | | |
|---|---|---|---|---|---|
| 2,799,140 | A | * | 7/1957 | Osborne ........................ | 60/563 |
| 3,364,818 | A | * | 1/1968 | Hager et al. ..................... | 91/24 |
| 3,613,520 | A | * | 10/1971 | Worden .......................... | 92/133 |
| 3,871,497 | A | * | 3/1975 | Bessiere ....................... | 477/202 |
| 4,453,380 | A | * | 6/1984 | Meynier ........................ | 60/534 |
| 4,917,000 | A | * | 4/1990 | Fecher ......................... | 91/369.2 |
| 4,939,901 | A | * | 7/1990 | Saalbach et al. ............... | 60/562 |
| 5,518,305 | A | * | 5/1996 | Jakobi et al. ............... | 303/114.3 |
| 6,571,660 | B2 | * | 6/2003 | Gmurowski et al. ........... | 74/512 |
| 6,676,118 | B2 | * | 1/2004 | Chou ........................... | 267/177 |
| 7,025,343 | B2 | * | 4/2006 | Chou ........................... | 267/177 |
| 7,234,922 | B2 | * | 6/2007 | Kunkler et al. ................. | 417/34 |
| 2013/0263588 | A1 | * | 10/2013 | Yoshimoto et al. ............ | 60/545 |

FOREIGN PATENT DOCUMENTS

JP    2009-067297    4/2009

* cited by examiner

*Primary Examiner* — Robert A Siconolfi
*Assistant Examiner* — James Hsiao
(74) *Attorney, Agent, or Firm* — Rankin, Hill & Clark LLP (57) ABSTRACT

A rear brake system has a rod extending from a master cylinder that inputs the operational force of a brake pedal to the master cylinder, a coil spring coaxially arranged with the rod and providing reaction force to return the brake pedal to the state before operating the brake pedal, a reaction adjustment mechanism provided on the rod and configured so as to be movable in the axial direction of the rod. According to the position of the reaction adjustment mechanism in the axial direction of the rod, shrinkage of the coil spring in the axial direction of the rod can be adjusted.

15 Claims, 6 Drawing Sheets

BRAKE SYSTEM OF STRADDLE TYPE VEHICLE

FIELD OF THE INVENTION

The present invention relates to a brake system of straddle type vehicle with a master cylinder generating hydraulic pressure by receiving an operational force of a brake pedal.

DESCRIPTION OF RELATED ART

A brake mechanism having a master cylinder generating hydraulic pressure by receiving an operational force of a brake pedal, and having a fluid chamber containing compressible fluid for providing the reaction force to return a brake pedal to the state before operating the master cylinder is known in the art. In this mechanism, the reaction force on the brake pedal can be adjusted by regulating the pressure of the compressible fluid inside the above-mentioned fluid chamber (For example, see Japanese Laid-open Patent Publication No. 2009-67297).

However, in the above-mentioned ordinal brake system, when the reaction force on the brake pedal is adjusted, the pressure of the compressible fluid has to be adjusted by the valve, which makes the adjustment work complicated.

SUMMARY OF THE INVENTION

The present invention has been achieved in consideration of the above-described circumstances, and aims to provide a brake system of straddle type vehicle that can easily adjust the reaction force on the brake pedal.

In accordance with the present invention, in a brake system of straddle type vehicle includes a brake pedal and a master cylinder generating hydraulic pressure by receiving an operational force on the brake pedal. The brake system further includes a rod that extends from the master cylinder and inputs the operational force of the brake pedal on the master cylinder. A coil spring is coaxially arranged with the rod and provides the reaction force to return the brake pedal to the state before operating the brake pedal. A reaction adjustment mechanism is provided on the rod and configured so as to be movable in the axial direction of the rod. Shrinkage of the coil spring in the axial direction of the rod can be adjusted according to the position on the rod of the reaction adjustment mechanism.

Due to the fact that the coil spring is coaxially arranged with the rod along the axial direction of the rod, the shrinkage of the coil spring can be adjusted by shifting the reaction adjustment mechanism provided on the rod to the axial direction of the rod. As such, the reaction force on the brake pedal can be more easily adjusted than in known mechanisms, which require adjustment to the pressure of the compressible fluid.

In further accordance with the present invention, the reaction adjustment mechanism is formed integrally or separately on the master cylinder, the coil spring is sandwiched by a receiver side retainer abutting on one end of the coil spring and a compression side retainer abutting on the other end of the coil spring, the compression side retainer is configured so as to be movable in the axial direction of the rod due to the fact that the compression side retainer is screwed with or threaded to the rod, the distance between the receiver side retainer and the compression side retainer can be adjusted according to the position of the compression side retainer on the rod, the shrinkage of the coil spring can be adjusted. Since the shrinkage of the coil spring can be adjusted by screwing or threading, and the reaction force on the brake pedal can be surely and easily adjusted by operations with hands or tools including spanner without using special tools even though the reaction force is high.

In accordance with another aspect of the invention, the rod has an input rod extended from the master cylinder, an adjust nut screwed with or threaded to the input rod. An external thread is formed on the input rod while an input side lock nut is screwed with or threaded to the external thread and arranged at the predetermined position on the external thread. The adjust nut is hollow and the input rod is screwed with or threaded to the internal thread formed on the inner periphery surface thereof. A flange portion formed on the end portion on the master cylinder side is positioned by abutting on the input side lock nut, and is screwed with or threaded to the compression side retainer by the external thread formed on the outer periphery surface thereof. The compression side retainer is positioned by abutting on the flange portion. Since the shrinkage of the coil spring can be adjusted based on the position of the input side lock nut on the input rod, the degree of the reaction force can be easily perceived and the reaction force can be easily adjusted.

In further accordance with the present invention, the adjust nut has a tool operation portion rotationally operated by predetermined tools on the end portion on the opposite side end portion of the master cylinder side. The input side lock nut can be successfully abutted on the adjust nut, and the input rod can be easily screwed with or threaded to the adjust nut.

In further accordance with the present invention, the rod additionally has a pedal side rod screwed with or threaded to the inner periphery surface of the adjust nut from the opposite side of the master cylinder side, the position of the brake pedal can be adjusted according to the screwing position with the adjust nut of the pedal side rod. Due to the fact that the pedal side rod can be moved into and out of the adjust nut by using the adjust nut and the brake pedal is connected to the pedal side rod, the position of the brake pedal can be adjusted with a simple configuration.

In further accordance with the present invention, a pedal side lock nut is screwed with or threaded to the external thread of said pedal side rod at the predetermined position and is abutted on the adjust nut according to the screwing position with the adjust nut of the pedal side rod. Due to the fact that the pedal side lock nut screwed with or threaded to the pedal side rod is abutted on the adjust nut, the pedal side rod can be positioned and the position of the brake pedal can be easily adjusted.

In further accordance with the present invention, the receiver side retainer is formed separately from the master cylinder, and is biased by the coil spring and supported on the master cylinder. The receiver side retainer is formed separately from the master cylinder and the master cylinder can maintain general versatility.

In further accordance with the present invention, the brake pedal is swingably supported on the vehicle body side by a pedal rotation axis, has a connection portion to which the pedal side rod is connected, and a pedal tread portion on which a rider presses down. The connection portion is arranged above the pedal rotation axis while the pedal tread portion is arranged below the pedal rotation axis. The connection portion is connected to the pedal side rod by a spherical bearing provided on the end portion of the pedal side rod. The spherical bearing can preferably operate the brake pedal in the upper and lower direction.

In further accordance with the present invention, the master cylinder and the brake pedal are supported on the same step bracket. The master cylinder and the brake pedal, which are in a sub assay (sub-assembly) state, can be assembled to the vehicle body on the step bracket.

In further accordance with the present invention, the reaction adjustment mechanism is arranged above the step bracket on the side of the vehicle. Due to the fact that the reaction adjustment mechanism is exposed to the side of the vehicle in the upper direction of the step bracket, the reaction force can be successfully adjusted.

DETAILED DESCRIPTION OF THE PREFERRED EMBODIMENTS

Hereinafter, the embodiment of the present invention will be explained with reference to the drawings. In addition, in the explanation hereinafter, the directions including "front", "rear", "right", and "left" and the like are the same as the directions in the vehicle unless there is a specific description. An arrow "FR" in the drawings shows the front direction of the vehicle, an arrow "UP" shows the upper direction of the vehicle, respectively.

Figure 1:
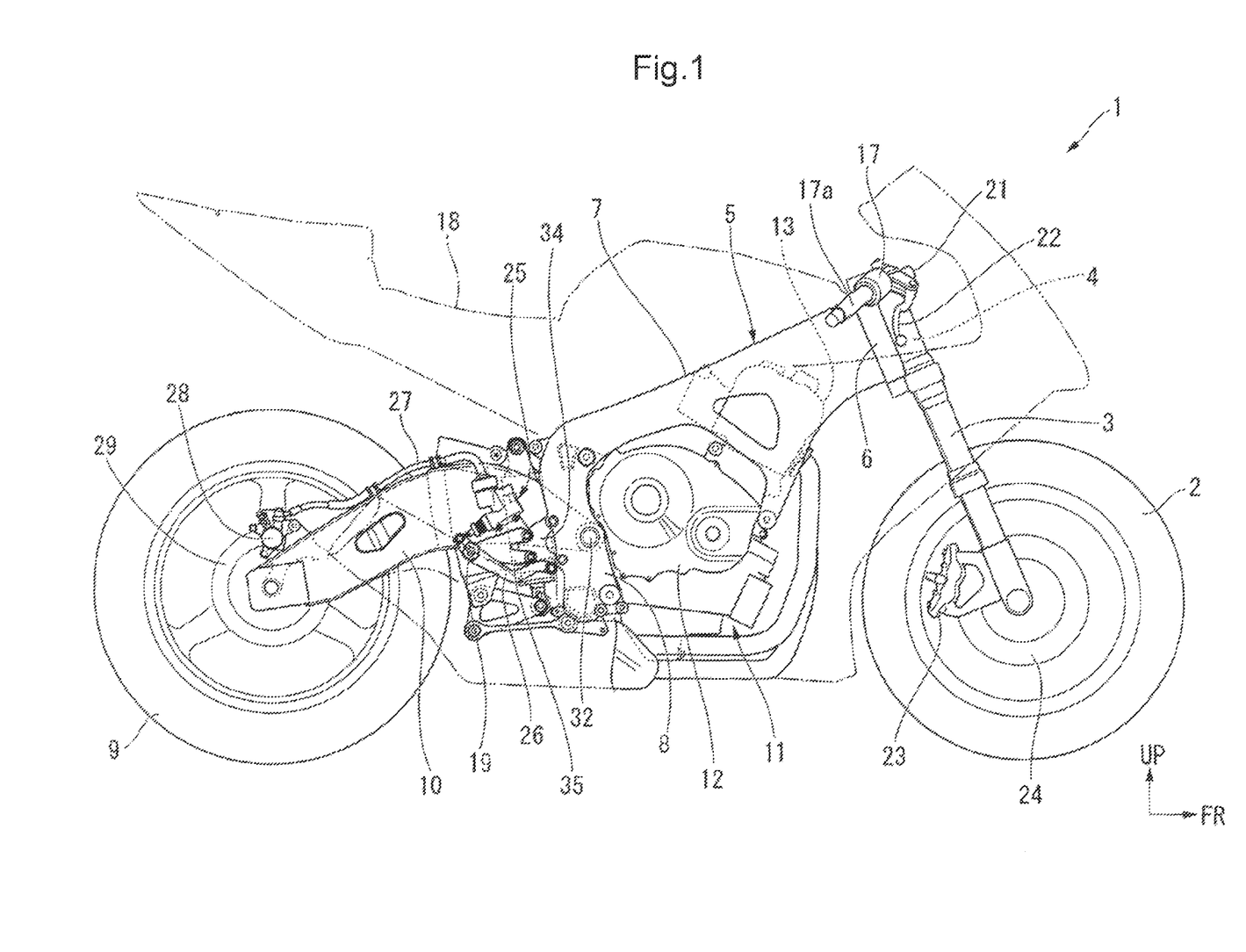
FIG. 1 is a right side view of the motorcycle having the brake system of straddle type vehicle according to the embodiment of the present invention.

FIG. 1 shows a motorcycle 1 having a mechanism related to the embodiment. In the motorcycle 1 (straddle type vehicle), the upper portion of right and left of front forks 3 axially supporting a front wheel 2 is steerably and pivotally supported on a head pipe 6, which is the front end portion of a body frame 5, through a steering stem 4. Right and left main frames 7 extend obliquely downward to the rear direction from the head pipe 6. The rear end portions of the main frames 7 are connected to the upper end portions of right and left pivot frames 8 extending to the upper and lower direction, respectively. A swing arm 10 suspending a rear wheel 9 is swingably supported on the pivot frame 8 through a pivot axis 32.

An engine 11, which is a motor of the motorcycle 1, is mounted inside the body frame 5. For example, the engine 11 is a four parallel cylinder engine whose crank axis is parallel to the width direction of the vehicle (the right and left direction). A cylinder 13 is vertically arranged on a crank case 12. For example, the output of the engine 11 is transmitted to the rear wheel 9 through the chain-drive type driving mechanism from the left side of the rear portion of the crank case 12.

A handle 17 for steering is installed on the upper end portion (or a steering stem 4) of the right and left front forks 3. A seat 18 for a rider is arranged obliquely rearward to the upper direction of the pivot frame 8. Moreover, right and left steps 19 (hereinafter, the left step is called as a left step 19, the right step is called as a right step 19) for the rider are arranged in the rear direction of a right and left pivot frames 8, respectively. The rider is seated on the seat 18 by straddling on a vehicle body, puts the right and left feet on the right and left of steps 19, respectively, and takes a riding posture putting the right and left hands on right and left grips 17a of the handle 17, respectively.

A front master cylinder 21, which is an oil pressure source of a front wheel brake system, is installed on the right grip 17a side of the handle 17. A brake lever 22 for operating the front master cylinder 21 is arranged in the front direction of the right grip 17a. When that the rider grips or pulls the brake lever 22 with the hand put on the grip 17a, oil pressure is generated inside the front master cylinder 21. The oil pressure is transmitted to a front brake caliper 23 supported on the lower end portion of the front fork 3 through a brake hose and the like (not shown). The front brake caliper 23 adjusts the rotation of the front wheel 2 by compressing a front brake rotor 24 supported on the front wheel 2.

On the other hand, a rear master cylinder 25, which is an oil pressure source of a rear wheel brake system, is arranged in the vicinity of the right step 19. A brake pedal 26 for operating the rear master cylinder 25 is arranged in the vicinity of the right step 19. When the rider presses down the brake pedal 26 with the foot put on the right step 19, oil pressure is generated inside the rear master cylinder 25. The oil pressure is transmitted to a rear brake caliper 28 supported on right side of the rear end portion of the swing arm 10 through a brake hose 27 and the like. The rear brake caliper 28 regulates the rotation of the rear wheel 9 by compressing a rear brake rotor 29 supported on the right side of the rear wheel 9.

A plate 34 projecting to the rear direction is provided in the middle portion of the right pivot frame 8 in the upper and lower direction. A step bracket 35 is provided so as to extend to the rear direction on the plate 34. The right step 19, the rear master cylinder 25, and the brake pedal 26 are supported on the step bracket 35. Hereinafter, the brake system related to the present embodiment configured so as to include the rear master cylinder 25 and the brake pedal 26 and the like will be described with reference to FIGS. 2 to 5.

Figure 2:
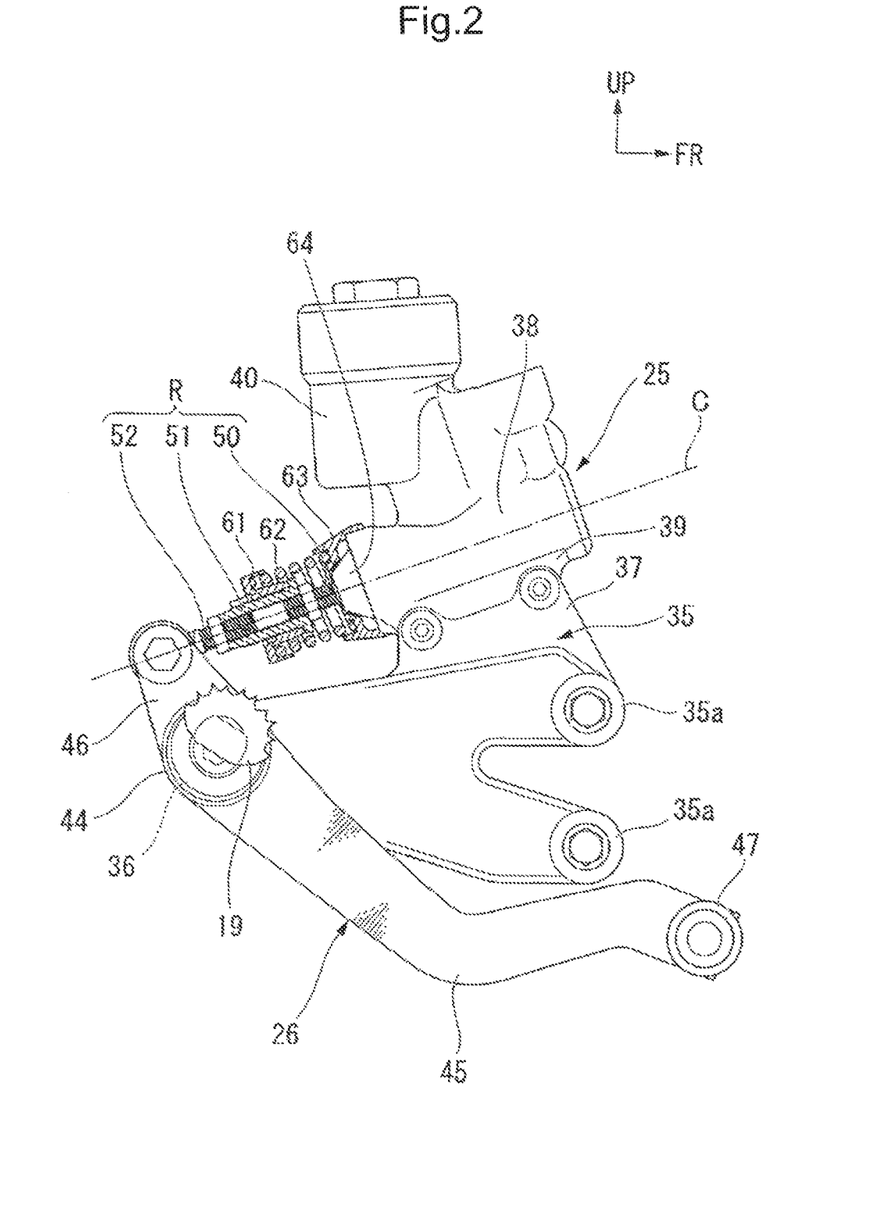
FIG. 2 is a right side view of the brake system according to the embodiment of the present invention.

As shown in FIG. 2, the step bracket 35 has a triangular shape whose angular portion faces to the rear direction in the side view, and is fixedly fastened to the plate 34 by upper and lower bracket fixing portions 35a on the front portion thereof. A step body supporting portion 36 is set on the rear end portion of the step bracket 35 (the above-mentioned angular portion). The right step 19 is supported on the step body supporting portion 36 so as to project to the outside in the width direction of the vehicle. The brake pedal 26 is arranged between the right step 19 and the step body supporting portion 36. A cylinder supporting plate 37 extending in the front and rear directions is projected upward on the front side upper portion of the step bracket 35. The rear master cylinder 25 is supported on the cylinder supporting plate 37.

The rear master cylinder 25 has a cylinder body 38 slidably containing a piston (not shown) inside thereof, and a bracket 39. The bracket 39, which projects to the outside in the radial direction against the axis C of the cylinder body 38 and extends along the axis C, is provided on the outer periphery portion of the cylinder body 38. The bracket 39 and the above-mentioned cylinder supporting plate 37 are fastened to each other. The rear master cylinder 25 is supported on the step bracket 35. The rear master cylinder 25 is positioned above the right step 19 in a state that the cylinder body 38, from the rear direction to the front direction, extends obliquely upward. In addition, a reservoir tank 40 for supplying the brake fluid (brake hydraulic oil) is integrally provided on the cylinder body 38 at the opposite position across the axis C relative to the position where the above-mentioned bracket 39 is formed.

A rod R extends rearward to the lower direction from the rear portion of the cylinder body 38. The rod R extends from the inside to the outside of the cylinder body 38. A base end portion of the rod R, which is positioned inside of the cylinder body 38, is connected to the piston (not shown) inside the cylinder body 38, while a tip portion of the rod R, which extends to the outside of the cylinder body 38, is connected to the brake pedal 26.

Figure 3:
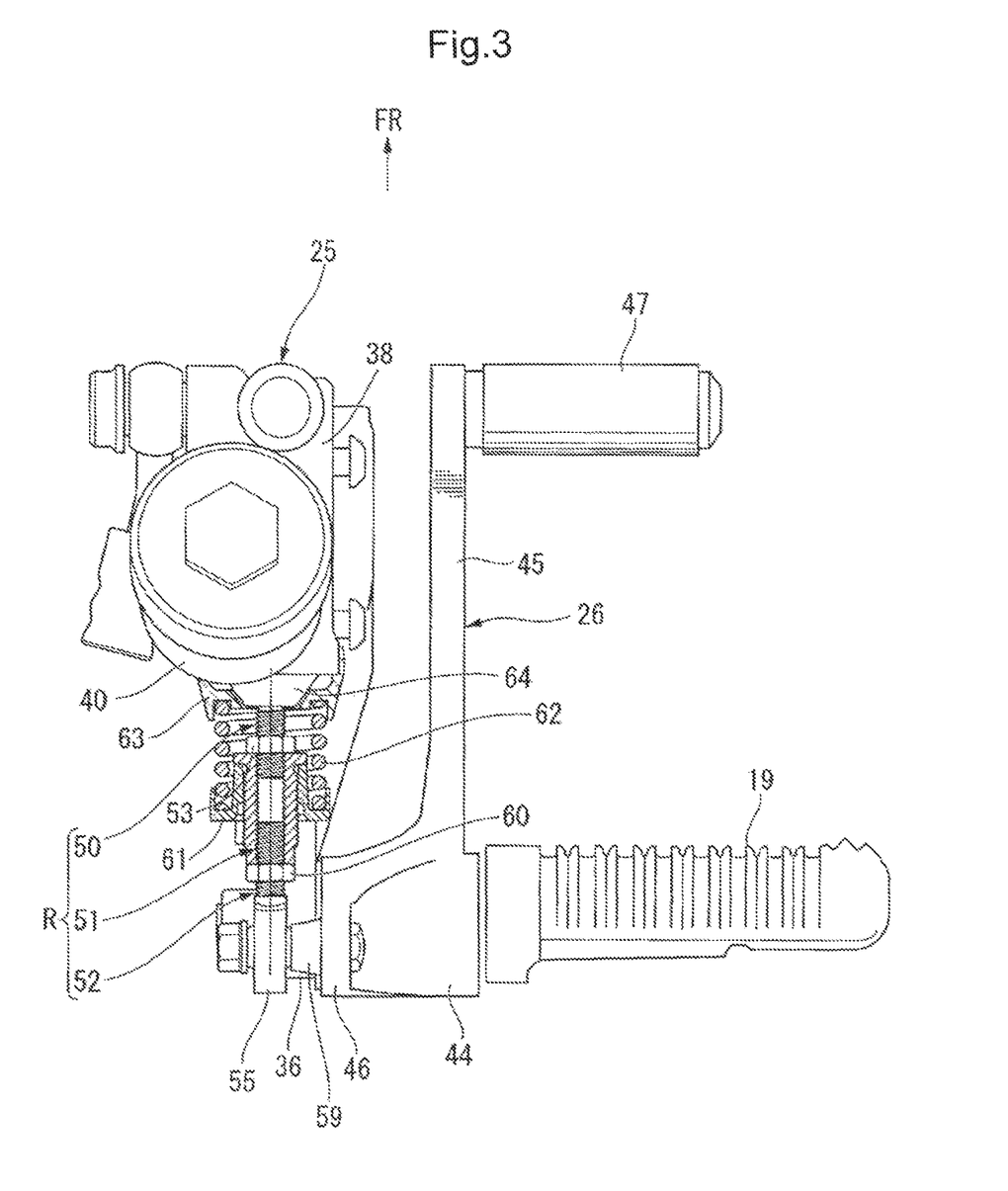
FIG. 3 is a view of the brake system according to the embodiment of the present invention, when viewed from the upper direction.
Figure 5:
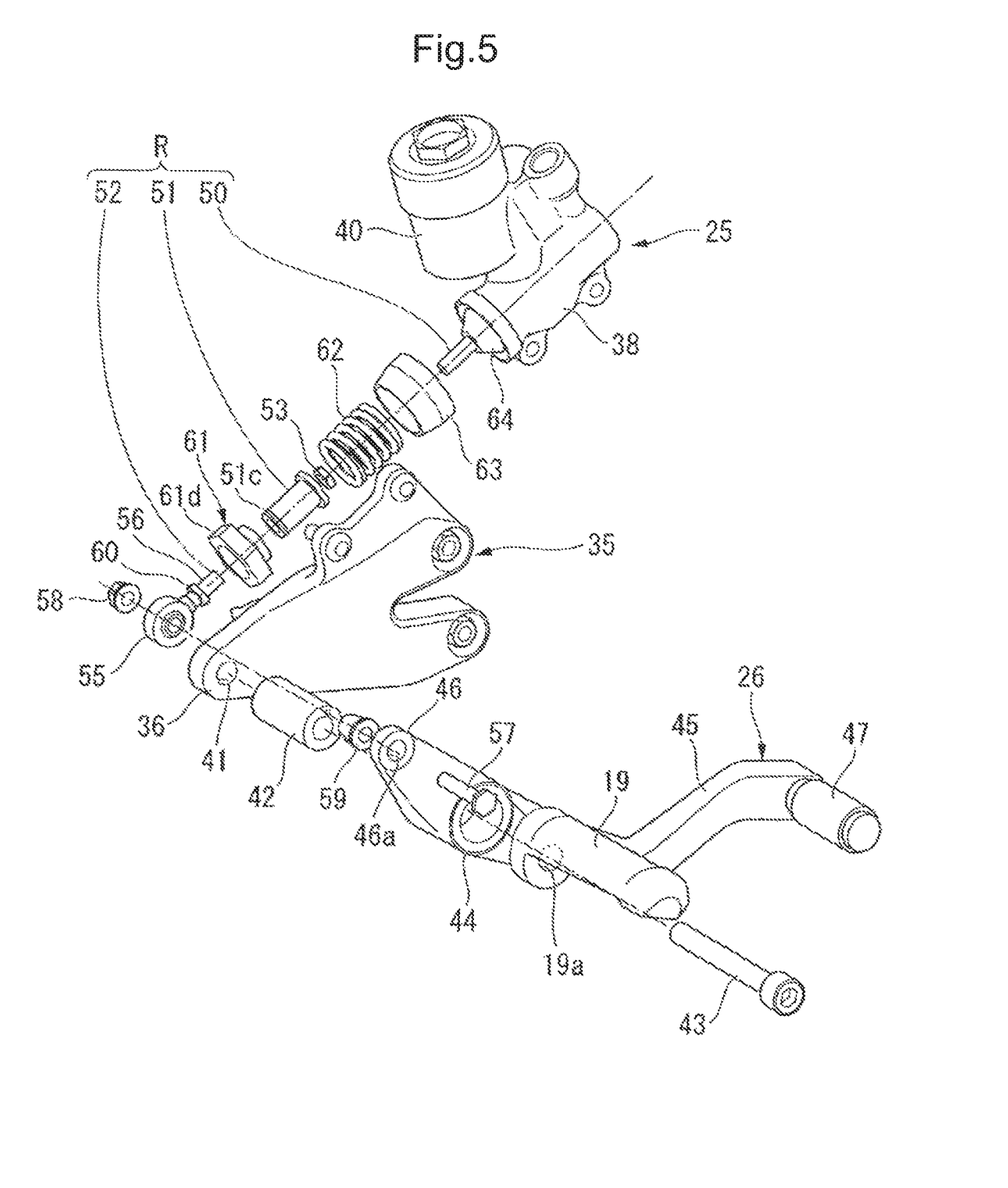
FIG. 5 is an exploded perspective view of the brake system according to the embodiment of the present invention.

As shown in FIG. 3, the brake pedal 26 is arranged between the step body supporting portion 36 and the right step 19 in the width direction of the vehicle. As shown in FIG. 5, a fixing hole 41 opened to the outside in the width direction of the vehicle is formed on the step body supporting portion 36. A bolt inserting hole 19a, which is along the longitudinal direction of the fixing hole 41, is formed on the base portion of the right step 19. A collar 42 is arranged between the step body supporting portion 36 and the right step 19. A bolt 43 is inserted from the outside of the bolt inserting hole 19a in the width direction of the vehicle, passes through the collar 42, and is fastened to the fixing hole 41 to support the right step 19 on the step body supporting portion 36. A boss portion 44 of the brake pedal 26 is swingably and axially supported on the above-mentioned collar 42, and the brake pedal 26 is positioned between the step body supporting portion 36 and the right step 19.

As shown in FIG. 2, the brake pedal 26 has a tread side arm portion 45 extending frontward and downwardly from the boss portion 44, and an acting end side arm portion 46 extending rearwardly and upwardly from the boss portion 44. A rod-like pedal tread portion 47 on the tip portion of the tread side arm portion 45 projects to the outside in the width direction of the vehicle. On the other hand, the tip portion of the acting end side arm portion 46 is connected to the tip portion of the above-mentioned rod R. An extended length of the tread side arm portion 45 is longer than the extended length of the acting end side arm portion 46. The tip portion of the acting end side arm portion 46 is arranged above the collar 42 while the pedal tread portion 47 is arranged below the collar 42. In addition, when the rider presses down the pedal tread portion 47 with the foot putting on the right step 19, the force is increased at a predetermined lever ratio and transmitted to the acting end side arm portion 46. The acting end side arm portion 46 pushes up the rod R (i.e., pushes the rod into the cylinder body 38), which generates hydraulic pressure inside the rear master cylinder 25.

In the present embodiment, the rod R includes an input rod 50 extended from the rear portion of the cylinder body 38 along the axis C of the cylinder body 38; an adjust nut 51 screwed with or threaded onto the input rod 50; and, a pedal side rod 52 screwed with or threaded into the inner periphery surface of the adjust nut 51 from the opposite side of the master cylinder 25.

Figure 4:
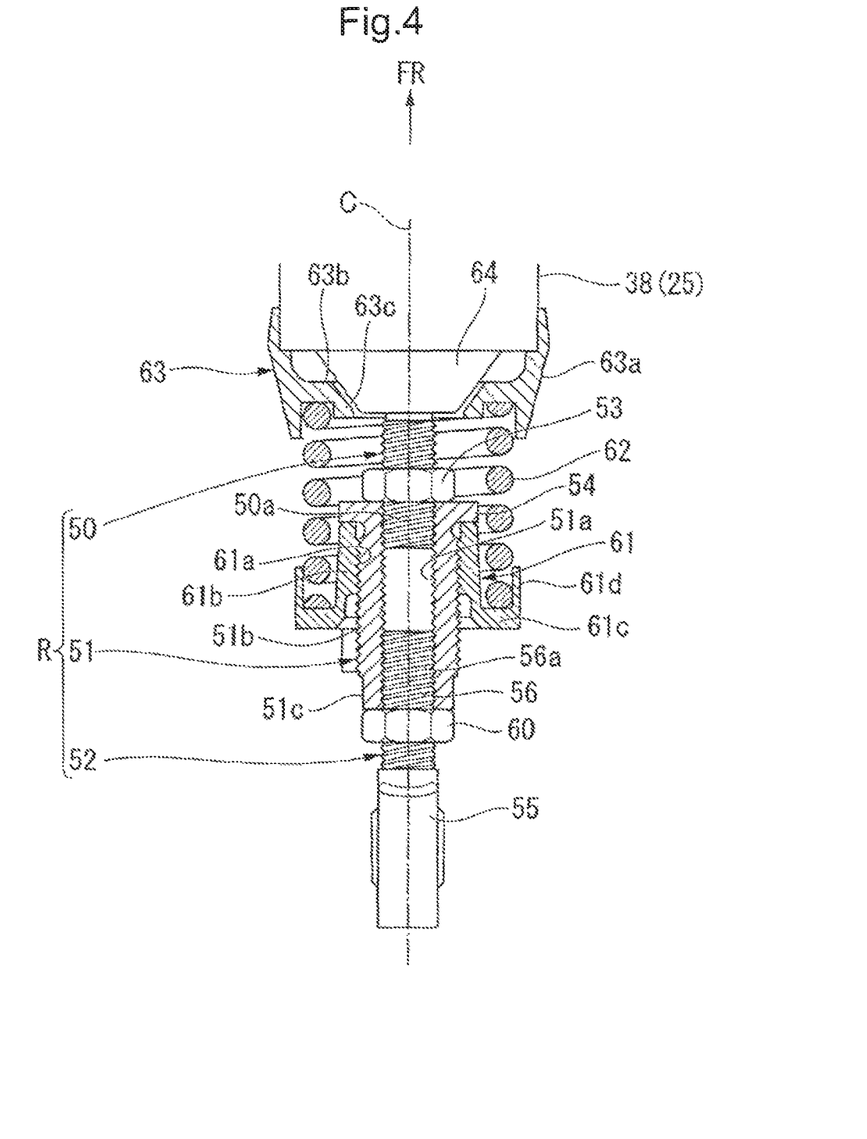
FIG. 4 is a cross-sectional view of the main parts of the brake system according to the embodiment of the present invention.

With reference to FIG. 4, the input rod 50 is connected to the above-mentioned piston (not shown) inside the cylinder body 38. An external thread portion 50a is formed on the exposed portion from the cylinder body 38. An input side lock nut 53 is arranged by screwing or threading at the predetermined position on the external thread portion 50a. On the other hand, the adjust nut 51 has a hollow and cylindrical body, and an internal thread portion 51a is formed on the inner periphery surface thereof. An external thread portion 51b is formed on the outer periphery surface thereof. The adjust nut 51 is screwed with or threaded onto the external thread portion 50a of the input rod 50 by the internal thread portion 51a formed on the inner periphery surface, and is connected to the input rod 50.

A flange portion 54 projecting to the outside in the radial direction is formed on the end portion of the adjust nut 51 on the master cylinder 25 side. Due to the fact that the flange portion 54 is abutted on the above-mentioned input side lock nut 53, the adjust nut 51 is positioned. In addition, a tool operation portion 51c having a regular hexagon shape in a cross section is formed on the outer periphery surface of the end portion on the opposite side end portion of the adjust nut 51 on the master cylinder 25 side (as shown with dots in FIG. 5, for explanatory convenience). The adjust nut 51 can be easily screwed onto the input rod 50 by rotating the tool operation portion 51c with predetermined tools including wrench and the like.

The pedal side rod 52 is a so-called pillow ball, which has a spherical bearing portion 55 and a rod body 56 projecting from the outer shell of the spherical bearing portion 55. An external thread portion 56a is formed on the outer periphery surface of the rod body 56. The pedal side rod 52 is screwed with or threaded into the internal thread portion 51a on the inner periphery surface of the adjust nut 51 by the external thread portion 56a, and is thereby connected to the adjust nut 51. In addition, a pedal side lock nut 60 abutting on the end portion of the adjust nut 51 is screwed with or threaded onto the external thread portion 56a on the outer periphery surface of the rod body 56.

The spherical bearing portion 55 is connected to the acting end side arm portion 46 of the brake pedal 26. With reference to FIG. 5, the spherical bearing portion 55 and the acting end side arm portion 46 are connected due to the fact that a bolt inserting hole 46a is formed on the acting end side arm portion 46, a bolt 57 inserted into the bolt inserting hole 46a is passed through the spherical bearing portion 55, and a nut 58 is screwed with the end portion of the bolt 57. In addition, a collar 59 is interposed between the spherical bearing portion 55 and the acting end side arm portion 46. By moving the pedal side rod 52 into and out of the adjust nut 51 to adjust the screwing position between the pedal side rod 52 and the adjust nut 51, the position of the brake pedal 26 (pedal tread portion 47) can be vertically adjusted.

A tubular-shaped compression side retainer 61, whose inner periphery surface is an internal thread portion 61a, is screwed with or threaded onto the external thread portion 51b of the adjust nut 51 so as to be movable in the axis C direction. A coil spring 62 is provided on the outer periphery side of the input rod 50 and the adjust nut 51, which is arranged on the same axis (that is, along the axis C) of the input rod 50 and the adjust nut 51, and applies the reaction force on the brake pedal 26 to return the brake pedal the state before operating the brake pedal 26.

The compression side retainer 61 has a tubular-shaped cylindrical portion body 61b whose inner periphery surface is the internal thread portion 61a; an annular abutting circular portion 61c projecting from the end portion of the cylindrical portion body 61b positioned on the pedal side rod 52 side to the radial direction; and, a tubular-shaped holding wall portion 61d extending from the outer peripheral edge of the abutting circular portion 61c along the cylindrical portion body 61b. In addition, with reference to FIG. 5, the holding wall portion 61d is formed as a regular hexagon shape in the cross section, and is configured so as to be easily operated by tools. Moreover, the end portion of the above-mentioned cylindrical portion body 61b on the rear master cylinder 25 side abuts on the flange portion 54 of the adjust nut 51. Accordingly, the compression side retainer 61 is positioned.

One end of the coil spring 62 is abutted on the cylinder body 38 side of the rear master cylinder 25 while the other end thereof is abutted on the abutting circular portion 61c of the compression side retainer 61. The other end of the coil spring 62 abutted on the abutting circular portion 61c is positioned by the holding wall portion 61d. The coil spring 62 is thus supported so as to be sandwiched by the cylinder body 38 and the compression side retainer 61.

A tubular-shaped receiver side retainer 63, which abuts on the above-mentioned one end of the coil spring 62, is fitted into the end portion of the cylinder body 38 so as to be non-rotatable. The one end side of the receiver side retainer 63 is fitted into the end portion of the cylinder body 38. The receiver side retainer 63 has a taper-like cylindrical portion body 63a whose other end side is a minor diameter than the one end side; an annular receiver portion 63b projecting from the inner periphery surface of the cylindrical portion body 63a to the inner side in the radial direction; and, an annular holding wall portion 63c projecting from the inner peripheral edge of the receiver portion 63b. The above-mentioned one end of the coil spring 62 abuts on the receiver portion 63b and is positioned by the holding wall portion 63c. Here, the receiver side retainer 63 is pressed against and supported on the cylinder body 38 by receiving the bias force of the coil spring 62. In addition, the other end side of the receiver side retainer 63 is a taper-like minor diameter, however, may be in a straight-shape, corresponding to the major diameter of the coil spring 62.

In addition, a dust boot 64, which is cylindrical with a bottom, is arranged inside of the receiver side retainer 63. The dust boot 64 covers the base side of the exposed portion of the input rod 50 to the outside. The input rod 50 penetrates the bottom portion of the dust boot 64 and extends to the brake pedal 26 side.

Here, with reference to FIGS. 1 and 2, the layout of the rear brake system according to the present embodiment will be explained. In a state that the rear master cylinder 25 is attached to the vehicle body with the step bracket 35, the rod R and the compression side retainer 61 and the like are positioned above the step bracket 35, and are exposed to the outside. Moreover, since the step bracket 35 is attached to the right pivot frame 8, the rod R and the compression side retainer 61 and the like are in the offset positions to the right from the center in the width direction of the vehicle.

Figure 6A:
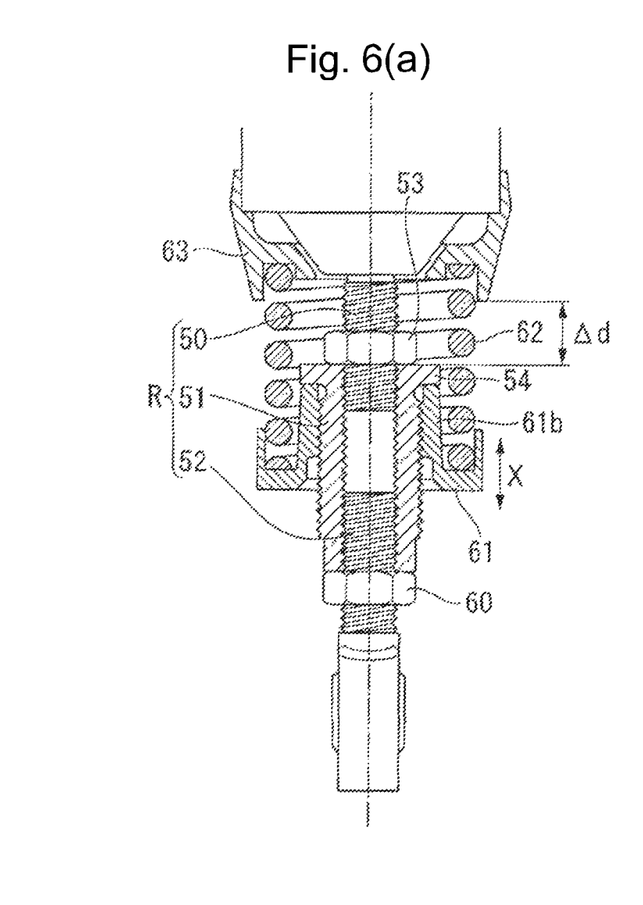
FIGS. 6(a) and 6(b) are views view explaining the reaction force regulation operation of the brake system according to the embodiment of the present invention.
Figure 6B:
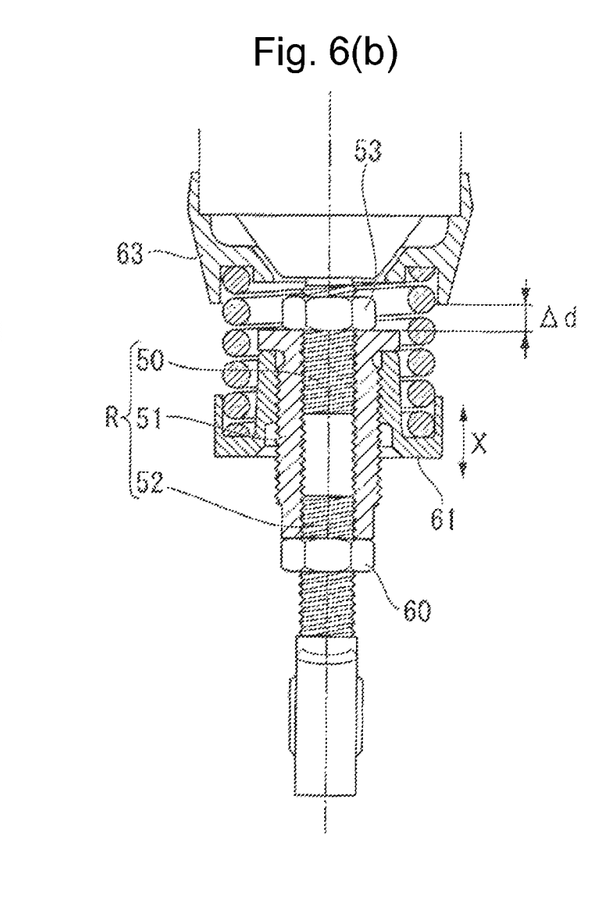

With reference to FIGS. 6(a) and 6(b), in the brake system according to the present embodiment configured as mentioned above, as shown as an arrow X in FIG. 6(a), the compression side retainer 61 can be moved to the axial direction of the rod R, and the distance between the receiver side retainer 63 and the compression side retainer 61 can be adjusted. Accordingly, for example shown in FIG. 6(b), the shrinkage of the coil spring 62 can be adjusted by shortening, and the reaction force on the brake pedal 26 can be adjusted.

In addition, when the position of the compression side retainer 61 is changed from the state shown in FIG. 6(a) to the state shown in FIG. 6(b), the position of the rod R of the input side lock nut 53 in the axial direction is changed and the adjust nut 51 is moved to the axial direction of the rod R. For the operation, the coil spring 62 and the like should be removed and assembled after positioning the input side lock nut 53.

Hereinafter, the assemble method of the brake system according to the above-mentioned embodiment will be explained. At the time of assembling, firstly, the receiver side retainer 63 is fitted into the cylinder body 38 of the master cylinder 25. Next, the input side lock nut 53 is set at the predetermined position on the input rod 50. Here, in order to increase the reaction force, the input side lock nut 53 is set on the back side of the input rod 50, that is, on the cylinder body 38 side. In order to relatively decrease the reaction force, the input side lock nut 53 is set on the near side of the input rod 50.

Specifically, the degree of the reaction force is confirmed by measuring the distance Δd between the adjust nut 51 and the receiver side retainer 63 in FIGS. 6(a) and 6(b).

Next, the adjust nut 51 is attached to the input rod 50, and is screwed by the time when the end portion thereof abuts on the input side lock nut 53.

Next, the coil spring 62 is arranged on the outer periphery of the adjust nut 51. After that, the compression side retainer 61 is screwed with the adjust nut 51. The compression side retainer 61 is moved to the predetermined position by screwing or rotating the outer surface 61d of the compression side retainer 61 with tools including spanners and shortening the coil spring 62.

Next, the pedal side rod 52 is screwed with or threaded into the adjust nut 51, the pedal side lock nut 60 is screwed with or threaded onto the pedal side rod 52 and into abutment with the adjust nut 51. Then, the brake pedal 26 is connected and positioned by screwing the pedal side lock nut 60. Then, the spherical bearing portion 55 of the pedal side lock nut 60 is connected to the acting end side arm portion 46 of the brake pedal 26. Here, in order to vertically adjust the position of the pedal tread portion 47 of the brake pedal 26, the position of the pedal side rod 52 should be adjusted.

Furthermore, as mentioned above, the assembly work may be done in a sub assay (sub-assembly) state that the rear master cylinder 25 and the brake pedal 26 are supported on the step bracket 35, or may be done in a state that the rear master cylinder 25, the brake pedal 26, and the step bracket 35 are attached to the vehicle body.

Here, in the present embodiment, the rod R and the compression side retainer 61 and the like are positioned above the step bracket 35 and are exposed to the outside. Since the rod R and the compression side retainer 61 and the like are positioned at the offset position to the right from the center in the width direction of the vehicle (in the side direction of the vehicle), the operation can be easily done, even though the rear master cylinder 25, the brake pedal 26 and step bracket 35 are installed on the vehicle body.

As described above, the brake system according to the present embodiment has the rod R extending from the rear master cylinder 25 and inputting the operational force of the brake pedal 26 to the master cylinder 25; the coil spring 62 coaxially arranged with the rod R and providing the reaction force on the brake pedal 26 to return the brake pedal to the state before operating the brake pedal 26; the compression side retainer 61 provided on the rod R as a reaction adjustment mechanism configured so as to be movable in the axial direction of the rod R. The shrinkage of the coil spring 62 in the axial direction of the rod R can be adjusted according to the position of the compression side retainer 61 on the rod R.

Accordingly, due to the fact that the shrinkage of the coil spring 62 can be adjusted by providing the coil spring 62 coaxially with the rod R and along the axial direction of the rod R, and by shifting the compression side retainer 61, which is the reaction adjustment mechanism provided on the rod R, to the axial direction of the rod R, the reaction force on the brake pedal 26 can be more easily adjusted as compared to known mechanisms that adjust the pressure of the compressible fluid.

Moreover, in the present embodiment, the coil spring 62 is sandwiched by the receiver side retainer 63 formed separately on the master cylinder 25 and abutting on one end of the coil spring 62 and the compression side retainer 61 abutting on the other end of the coil spring 62, the compression side retainer 61 is configured so as to be movable in the axial direction of the rod R by screwing/threading the compression side retainer 61 with the rod R. The distance between the receiver side retainer 63 and the compression side retainer 61 is adjusted according to the position of the compression side retainer 61 on the rod R, and the shrinkage of the coil spring 62 can be adjusted. According to the configuration, the shrinkage of the coil spring 62 can be adjusted by screwing. Even though the reaction force is high, the assembly can be surely and easily done.

Moreover, in the present embodiment, the rod R has the input rod 50 extended from the rear master cylinder 25 and the adjust nut 51 is screwed with or threaded onto the input rod 50. The external thread is formed on the input rod 50. The input side lock nut 53 is arranged by screwing at the predetermined position of the external thread. The adjust nut 51 is hollow and is screwed with input rod 50 by the internal thread formed on the inner periphery surface, and the flange portion 54 formed on the end portion of the master cylinder 25 side is positioned by abutting on the input side lock nut 53 and is screwed with the compression side retainer 61 by the external thread formed on the outer periphery surface thereof. The compression side retainer 61 is positioned on the flange portion 54 by abutting. According to the configuration, since the shrinkage of the coil spring 62 can be adjusted according to the position of the input side lock nut 53 on the input rod 50, the degree of the reaction force can be easily perceived, and the reaction force can be easily adjusted.

Moreover, in the present embodiment, the adjust nut 51 has the tool operation portion 51c rotationally operated by the predetermined tool on the end portion on the opposite side end portion of the rear master cylinder 25 side. Accordingly, the adjust nut 51 can be easily abutted on the input side lock nut 53 while the adjust nut 51 can be easily screwed with the input rod 50.

Moreover, in the present embodiment, the rod R additionally has the pedal side rod 52 screwed with the inner periphery surface of the adjust nut 51 from the opposite side of the master cylinder 25 side, the position of the brake pedal 26 can be adjusted according to the screwing position of the adjust nut 51 of the pedal side rod 52. Accordingly, due to the fact that the pedal side rod 52 can be moved into and out of the adjust nut 51 by using the adjust nut 51, and the pedal side rod 52 is connected to the brake pedal 26, the position of the brake pedal 26 can be adjusted with a simple configuration.

Furthermore, in the present embodiment, the pedal side lock nut 60 is provided such that the pedal side lock nut 60 is screwed at the predetermined position on the external thread of the pedal side rod 52 and is abutted on the adjust nut 51 according to the screwing position of the pedal side rod 52 with the adjust nut 51. Accordingly, the pedal side rod 52 can be positioned by abutting the pedal side lock nut 60 screwed with the pedal side rod 52 on the adjust nut 51, and the position of the brake pedal 26 can be easily adjusted.

Moreover, in the present embodiment, the receiver side retainer 63 is formed separately from the rear master cylinder 25, is biased by the coil spring 62, and is supported on the rear master cylinder 25. Accordingly, the receiver side retainer 63 is formed separately the rear master cylinder 25, the rear master cylinder 25 can keep general versatility.

Moreover, in the present embodiment, the brake pedal 26 is swingably supported on the vehicle body side by the collar 42, which is a pedal rotation axis, and has the acting end side arm portion 46, which is a connecting portion to which the pedal side rod 52 is connected, and the pedal tread portion 47 on which the rider presses down. The acting end side arm portion 46 is arranged above the collar 42 while the pedal tread portion 47 is arranged below the collar 42. The acting end side arm portion 46 is connected to the pedal side rod 52 by the spherical bearing portion 55 provided on the end portion on the pedal side rod 52. Accordingly, the brake pedal 26 can be preferably operated in upper and lower direction by the spherical bearing portion 55.

The embodiment of the present invention is described as above. However, the present invention is not limited to the above-mentioned embodiment. For example, the rear master cylinder 25 is not limited to the one special for rear wheel brake, and may be one for an oil pressure source in a combined brake system that balances front and rear wheel braking force. Moreover, in the above-mentioned embodiment, the receiver side retainer 63 is formed separately from the master cylinder 25 However, the portion corresponding to the receiver side retainer 63 may be integrally formed with the rear master cylinder 25.

DESCRIPTION OF REFERENCE NUMBERS 1 motorcycle (straddle type vehicle)
25 master cylinder
26 brake pedal
42 collar (pedal rotation axis)
46 acting end side arm portion (connection portion)
47 pedal portion (pedal tread portion)
50 input rod
51 adjust nut
51c tool operation portion
52 pedal side rod
53 input side lock nut
54 flange portion
55 spherical bearing portion
60 pedal side lock nut
61 compression side retainer
62 coil spring
63 receiver side retainer
R rod

What is claimed is:

1. A brake system for a straddle type vehicle, said brake system comprising a brake pedal and a master cylinder generating hydraulic pressure by receiving an operational force of the brake pedal, said brake system further comprising:
a rod that extends from said master cylinder and inputs the operational force of said brake pedal to said master cylinder;
a coil spring that is coaxially arranged with said rod and provides a reaction force on said brake pedal to return said brake pedal to a state before operating said brake pedal;
a reaction adjustment mechanism that is provided on said rod and configured so as to be movable in an axial direction of said rod,
wherein said reaction adjustment mechanism comprises a compression side retainer, said compression side retainer is threaded to said rod so as to be movable in the axial direction of said rod,
said coil spring is sandwiched by a receiver side retainer abutting on one end of said coil spring and said compression side retainer abutting on the other end of said coil spring,
a distance between said receiver side retainer and said compression side retainer can be adjusted by threadably adjusting a position of said compression side retainer on said rod, wherein a shrinkage of said coil spring in the axial direction of said rod can be adjusted by threadably adjusting a position of said compression side retainer on said rod, wherein the reaction adjustment mechanism is formed on said master cylinder and said receiver side retainer is formed separately from said master cylinder and is biased by said coil spring and is supported on said master cylinder.

2. The brake system according to claim 1, wherein said rod comprises an input rod and an adjust nut, said input rod extends from said master cylinder, said adjust nut is threaded with said input rod, an external thread is formed on said input rod, an input side lock nut is threaded on the external thread and arranged at a predetermined position on the external thread, said adjust nut is hollow, said adjust nut comprises an internal thread portion formed on an inner periphery surface thereof, an external thread portion formed on an outer periphery surface thereof, and a flange portion formed on an end portion on a master cylinder side, said flange portion is positioned by abutting on said input side lock nut, said input rod is threadably engaged with said internal thread portion of said adjust nut, said adjust nut is threaded to said input rod so as to be movable in the axial direction of said rod, said compression side retainer is threaded onto said external thread portion of said adjust nut so as to be movable in the axial direction of said rod, said compression side retainer is positioned by abutting on said flange portion of said adjust nut.

3. The brake system according to claim 2, wherein said adjust nut has a tool operation portion rotationally operated by predetermined tools on the end portion on the opposite side end portion of said master cylinder side.

4. The brake system according to claim 2, wherein said rod further comprises a pedal side rod threaded to the inner periphery surface of said adjust nut from the opposite side of said master cylinder side, the position of said brake pedal can be adjusted according to a screwing position with said adjust nut of the pedal side rod.

5. The brake system according to claim 4, further comprising a pedal side lock nut, the pedal side lock nut is threaded to the external thread of said pedal side rod at the predetermined position and is abutted on said adjust nut according to said screwing position with said adjust nut of said pedal side rod.

6. The brake system according to claim 4, wherein said brake pedal is swingably supported on a vehicle body side by a pedal rotation axis, and has a connection portion to which said pedal side rod is connected and a pedal tread portion on which a rider presses down, said connection portion is arranged above said pedal rotation axis while said pedal tread portion is arranged below said pedal rotation axis, said connection portion is connected to said pedal side rod by a spherical bearing provided on the end portion of said pedal side rod.

7. The brake system according to claim 1, wherein said master cylinder and said brake pedal are supported on a step bracket.

8. The brake system according to claim 7, wherein said reaction adjustment mechanism is arranged above said step bracket.

9. The brake system according to claim 3, wherein said rod includes a pedal side rod threaded to the inner periphery surface of said adjust nut from the opposite side of said master cylinder side, the position of said brake pedal can be adjusted according to a screwing position with said adjust nut of the pedal side rod.

10. The brake system according to claim 9, further comprising a pedal side lock nut, the pedal side lock nut is threaded to the external thread of said pedal side rod at the predetermined position and is abutted on said adjust nut according to said screwing position with said adjust nut of said pedal side rod.

11. The brake system according to claim 9, said brake pedal is swingably supported on a vehicle body side by a pedal rotation axis, and has a connection portion to which said pedal side rod is connected and a pedal tread portion on which a rider presses down, said connection portion is arranged above said pedal rotation axis while said pedal tread portion is arranged below said pedal rotation axis, said connection portion is connected to said pedal side rod by a spherical bearing provided on the end portion of said pedal side rod.

12. The brake system according to claim 2, wherein said master cylinder and said brake pedal are supported on a step bracket.

13. The brake system according to claim 3, wherein said master cylinder and said brake pedal are supported on a step bracket.

14. A brake system for a straddle type vehicle, said brake system comprising a brake pedal and a master cylinder generating hydraulic pressure by receiving an operational force of the brake pedal, said brake system further comprising:

a rod that extends from said master cylinder and inputs the operational force of said brake pedal to said master cylinder;

a coil spring that is coaxially arranged with said rod and provides a reaction force on said brake pedal to return said brake pedal to a state before operating said brake pedal;

a reaction adjustment mechanism that is provided on said rod and configured so as to be movable in an axial direction of said rod, wherein said reaction adjustment mechanism comprises a compression side retainer, said compression side retainer is threaded to said rod so as to be movable in the axial direction of said rod, said coil spring is sandwiched by a receiver side retainer abutting on one end of said coil spring and said compression side retainer abutting on the other end of said coil spring, a distance between said receiver side retainer and said compression side retainer can be adjusted by threadably adjusting a position of said compression side retainer on said rod, wherein a shrinkage of said coil spring in the axial direction of said rod can be adjusted by threadably adjusting a position of said compression side retainer on said rod, wherein said master cylinder and said brake pedal are supported on a step bracket and said reaction adjustment mechanism is arranged above said step bracket.

15. The brake system according to claim 14, wherein said receiver side retainer is formed separately from said master cylinder and is biased by said coil spring and is supported on said master cylinder.

* * * * *